Sept. 15, 1936.  J. GOGAN  2,054,197

HARDNESS TESTING MACHINE

Filed July 5, 1934  2 Sheets-Sheet 1

INVENTOR
JOSEPH GOGAN
Kwis, Hudson & Kent
ATTORNEYS

Sept. 15, 1936.   J. GOGAN   2,054,197
HARDNESS TESTING MACHINE
Filed July 5, 1934   2 Sheets-Sheet 2
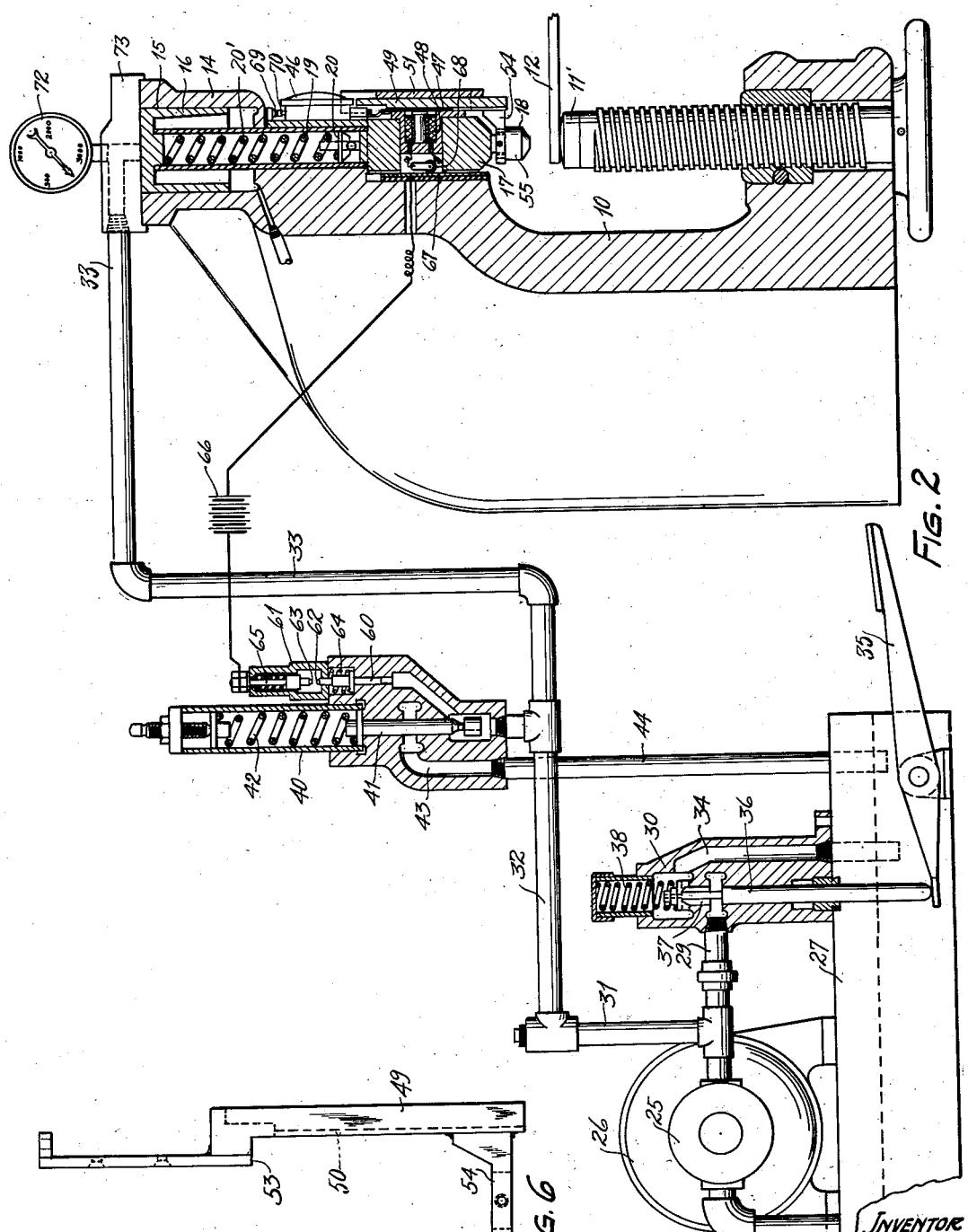

Patented Sept. 15, 1936

2,054,197

UNITED STATES PATENT OFFICE 2,054,197

HARDNESS TESTING MACHINE

Joseph Gogan, Lakewood, Ohio

Application July 5, 1934, Serial No. 733,835

3 Claims. (Cl. 265—14)

This invention relates generally to apparatus for testing the strength of materials, and more particularly to an improved machine for rapidly and acccurately testing the hardness of metal bodies.

An object of the present invention is to provide an improved machine of the type mentioned, wherein novel means is provided for eliminating error from the test readings, such as error resulting from the deflection of the body being tested by reason of its being pressed against the work support or anvil, and also the error resulting from the stretch or distortion produced in the frame, or other parts, of the machine, by reason of the testing force being applied.

A further object of the invention is to provide an improved testing machine of the type mentioned, wherein the distortion indicating means includes a movable gauge support which is retained in engagement with the test piece during the distorting thereof so as to eliminate undesirable error factors from the gauge reading.

It is also an object of this invention to provide an improved testing machine, of the type mentioned, having a movable slide carrying a penetrator and a gauge support adapted to be lowered by the slide into engagement with the test piece, and wherein the slide is movable relative to the gauge support after the gauge support has engaged the test piece.

Other objects and advantages of this invention will be apparent from the following description, when taken in conjunction with the accompanying sheets of drawings, wherein Fig. 1 is a perspective view showing a hardness testing machine embodying my invention.

Fig. 2 is a view, more or less diagrammatic in form, and representing a vertical section taken through the center lines of the more important parts of the device.

Fig. 6 is a detached side view of the gauge support.

In the accompanying drawings, to which detailed reference will now be made, I have shown my hardness testing machine as an improvement over the testing apparatus disclosed in my earlier application Serial No. 654,988, filed February 3, 1933, now Patent No. 2,009,316 issued July 23, 1935. As will be explained more fully hereinafter, the apparatus of the present invention includes novel distortion indicating mechanism by reason of which objectionable error factors may be eliminated from the test readings so that extremely accurate test results are obtained. It will be understood, of course, that although the invention is disclosed in connection with testing apparatus of the type disclosed in my earlier application, the principle of the invention may be readily applied to various other kinds of testing machines and devices.

Figure 1:
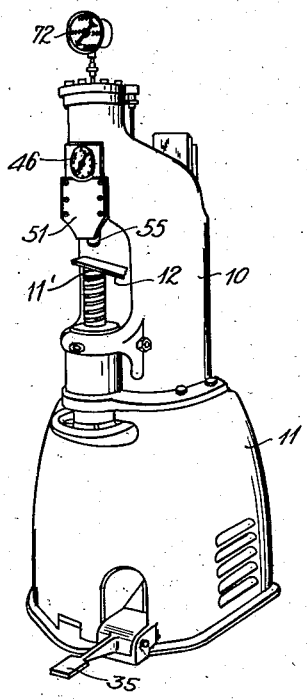

In Fig. 1 of the drawings I have shown one form of testing machine in which my invention may be embodied, such machine comprising, in general, a frame 10 and a hollow base 11 which supports the frame and which may contain some of the mechanism of the machine.

As shown in Fig. 2 of the drawings, the frame 10 may be a frame of the gap type having a vertically adjustable work supporting anvil 11' upon which a test piece 12 may be rested. The anvil and the adjusting means therefor may comprise any suitable apparatus of this kind which is already known in the art.

The frame 10 may also have a head portion 14 spaced above the anvil and in which is formed a pressure fluid cylinder 15. A piston 16 is arranged for operation in the cylinder for actuating the slide or plunger 17 to cause a test member 18 to be moved downwardly into engagement with the test piece 12. The piston, the slide 17, and the test member 18 may be arranged to be retracted by means of a coil spring 19 which is located between the underside of the piston and a stationary abutment 20. The piston may be connected to the slide by any suitable means such as the tubular member 20' in which the spring 19 may be disposed.

The test member may be of any suitable form, depending upon the nature of the test to be made and the characteristics of the piece to be tested. For example, this member may be a penetrator such as a hardened steel Brinell ball 21, a diamond point, or any other suitable test piece distorting device. In this instance a Brinell ball is shown and this ball may be connected to the slide 17 by being mounted in a suitable chuck 22 which is provided at the lower end of the slide.

The slide 17 may be actuated by any suitable means for causing the penetrator 21 to be moved into engagement with, and to distort the test piece end, in this instance, I show pressure fluid supply means similar to that which is described in my copending application mentioned above, and which supplies pressure fluid to the cylinder 15 for actuating the piston 16 therein.

For purposes of the present invention, this pressure fluid supply means need not be described in great detail, but in general may comprise a pump 25 which is driven by an electric motor 26. Fluid, such as oil, is taken up from the reservoir 27 by the suction pipe 28 of the pump and is discharged either through a pipe 29 and a control valve 30 back to the reservoir, or through piping 31, 32 and 33 to the cylinder 15.

The motor 26 and the pump 25 are ordinarily operated continuously during the testing work and, preparatory to the making of a test, the valve 30 is in the open position shown in the drawings and the fluid discharged by the pump is returned to the reservoir through the passage 34. When a test piece has been placed upon the anvil 11' and a test is to be made thereon, the operator depresses the lever 35, causing the valve plunger 36 to move upwardly and close the opening 37 in the control valve 30. This prevents fluid from being returned to the reservoir and causes the pump discharge to be supplied to the cylinder 15 to actuate the piston 16, the slide 17, and the test member 18. When the test has been completed and the lever 35 has been released, the valve plunger 36 is moved downwardly by the spring 38 thus allowing the pump discharge to again flow directly into the reservoir. This also releases the fluid pressure in the cylinder 15 which fluid is returned to the reservoir through the piping 33, 32 and 31, and the valve passage 34.

Since the success and accuracy of this testing apparatus depends in part upon a predetermined test load being accurately applied to the test member, I provide by-pass valve 40 for preventing the pressure of the fluid from exceeding a desired predetermined value. This valve may comprise a plunger 41 which is adapted to be raised against the spring 42 by the pressure fluid acting against the lower end of the plunger. When the fluid pressure is sufficient to move the plunger 41 high enough to open the passage 43, pressure fluid is by-passed from the supply line to the reservoir 27 through the return passage 44 and, by reason of this pressure regulating valve, a desired predetermined pressure may be supplied to the cylinder 15 and the test load to be applied to the piece is prevented from exceeding a desired maximum value.

For measuring the distortion produced in the test piece by the test member 18, or in other words for measuring the distance to which the penetrator 21 has been forced into the test piece 12 by a test load having a maximum value as determined by the regulating valve 40, I provide indicating means which includes a suitable gauge 46 and a gauge actuating member 47. The gauge actuating member is a strip-like part of magnetic material which is suitably attached to the stem 47' of the gauge and is adapted to be releasably connected to the slide 17 by energization of an electromagnet 48.

According to an important feature of my invention whereby error factors are eliminated from the test readings, the gauge 46 is mounted upon a movable gauge support or bracket 49 which is arranged so that the bracket may be moved into engagement with, and supported upon, the test piece 12. The gauge bracket 49 may be constructed and arranged in various ways, but I prefer to arrange the same adjacent the slide 17 with a portion thereof slidable in a groove or way 50 formed in a cover 51 mounted on the frame. In other words, the gauge support or bracket 49 may be arranged between the slide 17 and the cover 51 so that the support is slidable in the groove 50 of the cover and is movable relative to the slide 17 during a portion of the stroke of the latter. In this instance the slide 17 is provided with an abutment or shoulder 52 and the gauge support is provided with an offset portion forming an oppositely disposed abutment or shoulder 53. The abutment 53 of the gauge support overhangs and rests upon the abutment 52 of the slide so that the gauge support will, in effect, be hung on the slide and can be lowered with the latter when a test is to be made.

Figure 3:
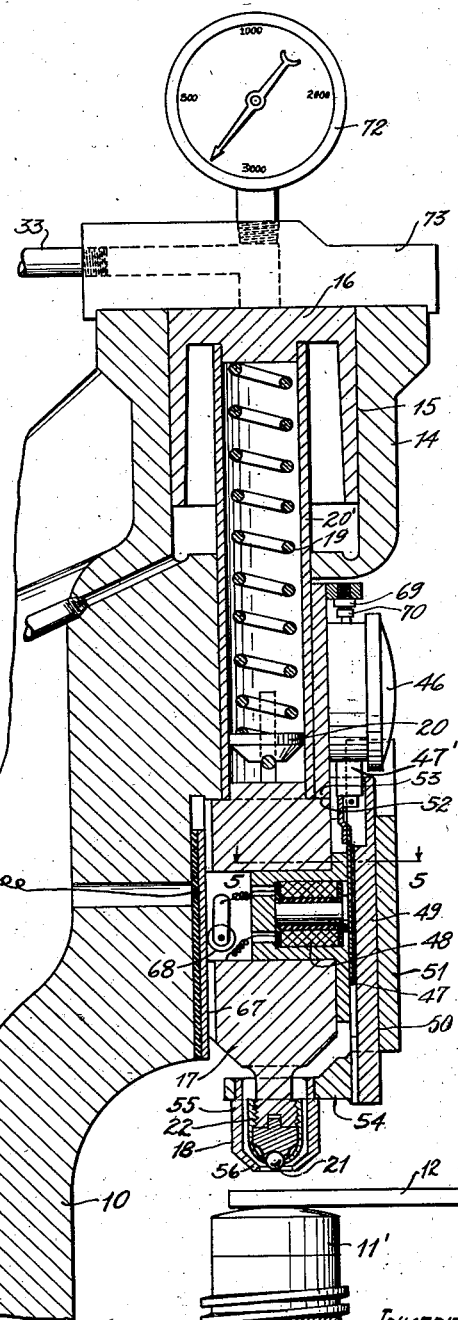
Fig. 3 is a central sectional view taken through a portion of the testing machine and showing a part of the apparatus of Fig. 2 on a larger scale.
Figure 5:
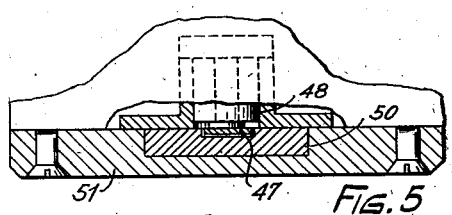
Fig. 5 is a partial transverse sectional view taken through the gauge supporting means as indicated by line 5—5 of Fig. 3.
Figure 4:
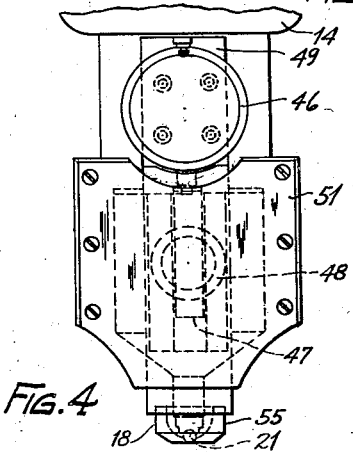
Fig. 4 is a front elevational view showing the novel gauge supporting means.

The portion of the gauge support which is to contact with the test piece may be of any suitable construction but, as shown in Fig. 3, I prefer to provide the gauge support with a laterally extending portion 54 which may be provided with a cup-shaped contact member 55. This contact member may be disposed around the chuck 22 and may have an opening 56 at its lower end to accommodate the penetrator 21.

From the arrangement just described it will be seen that when a test is being made and the slide 17 is being lowered toward the test piece 12, the gauge support 49 and the gauge 46 thereon will be lowered with the slide. When the cup-shaped member 55 of the gauge support engages the test piece the downward movement of the gauge support is arrested and, by reason of the releasable connection provided by the cooperating abutments 52 and 53, the gauge support then remains substantially stationary and the slide moves on downwardly to cause the penetrator 21 to distort the test piece.

When the slide 17 is moved downwardly and the penetrator 21 engages the test piece this engagement causes the pressure of the fluid being supplied to the cylinder 15 to be increased by reason of the resistance to movement encountered by the penetrator. The increased pressure of the fluid acts upon a plunger 60 of an electric switch device 61. The plunger 60 carries a contact 62 which engages a contact 63 when the plunger 60 is moved upwardly by the pressure fluid acting in opposition to the spring 64. The contact 63 is carried by a resiliently mounted stem 65 which is insulated from the surrounding structure and, when the contact 62 engages the contact 63, the electromagnet 48 is energized by current supplied from a suitable source, such as the storage battery 66.

The circuit of the electromagnet 48 may include a contact strip 67 which is insulated from the frame portion 14, and a contact roller device 68 which cooperates with the strip 67. The energization of the electromagnet 48 causes the gauge actuating member 47 to be magnetically attracted and thereby releasably connected to the slide 17 so that further downward movement of the slide will cause the gauge 46 to be operated and the resulting gauge reading will indicate accurately the extent to which the penetrator has been forced into the test piece by the predetermined test load.

After the test is completed and the pressure of the fluid in the cylinder 15 has been released, the switch contacts 62 and 63 separate and cause the electromagnet 48 to be deenergized. This allows the gauge pointer to return to its zero position which may be adjusted as desired by means of an adjusting screw 69 carried on the gauge supporting bracket and arranged to cooperate with the gauge adjusting stem 70.

It will be seen from the arrangement and operation of the apparatus as herein described, that the test piece is distorted by the penetrator 21 only after the gauge support 49 has been moved downwardly by the slide and has been rested or supported upon the test piece 12. When the distorting pressure is applied to the test piece by the penetrator, it is likely that some stretch will occur in the frame of the machine, or in other parts of the apparatus, and that the anvil 11' will be pressed into the test piece to some extent. The penetration of the test piece by the anvil and the deflection in the machine would ordinarily produce error in the gauge reading but, since the gauge support rests upon the test piece, it will be seen that the position of the gauge, with respect to the portion of the test piece being acted upon by the penetrator 21, will remain substantially constant throughout the test and the gauge readings therefore will not be inaccurate by the inclusion of these error factors.

If desired, a pressure gauge 72 may be conveniently mounted on the cover 73 of the cylinder 15 to visibly indicate the value of the test load being applied to the test piece.

It will be understood, of course, that in making tests with this improved apparatus the operator notes the gauge reading obtained from each piece being tested, and if the gauge reading does not correspond with the gauge reading obtained from the proved or master test piece, the operator knows that the piece in question is either too soft, or too hard, and may reject or pass the same according to his instructions.

While I have illustrated and described my improved testing apparatus in a detailed manner, it should be understood, however, that I do not wish to be limited to the precise details of construction and arrangements of parts illustrated and described, but regard my invention as including such changes and modifications as do not involve a departure from the spirit of the invention and the scope of the appended claims.

Having thus described my invention, I claim:

1. In a testing machine the combination of a reciprocable spindle, a penetrator carried thereby, said spindle having a laterally offset abutment shoulders cooperating to provide a sepato said spindle and also having a laterally offset abutment shoulder, said laterally offset abutment shoulders cooperating to provide a separable connection whereby the gage support is adapted to be lifted by upward movement of the spindle and to be lowered into engagement with the work by downward movement of the spindle, a gage on said support, and means for causing actuation of the gage in response to downward movement of the spindle after engagement of the gage support with a test piece.

2. In a testing machine the combination of a reciprocable spindle, a penetrator, a gage support movable relative to said spindle and comprising a member having a laterally offset portion and an opening adjacent said offset portion, means on said spindle adapted to engage said offset portion whereby upward movement of the spindle lifts the gage support and downward movement lowers the gage support into engagement with a test piece, a gage on said support, and means for operating said gage in response to relative movement between the spindle and gage support including a gage operating member extending into said opening.

3. In a testing machine the combination of a reciprocable spindle, a penetrator, a gage support movable relative to said spindle and comprising a member having a laterally offset portion and an opening adjacent said offset portion, means on said spindle adapted to engage said offset portion whereby upward movement of the spindle lifts the gage support and downward movement lowers the gage support into engagement with a test piece, a gage on said support, means for operating said gage in response to relative movement between the spindle and gage support including a gage operating member extending into said opening, and means on said support cooperating with the gage to provide for adjustment thereof.

JOSEPH GOGAN.